(12) United States Patent
Knox (10) Patent No.: US 7,161,456 B2
(45) Date of Patent: Jan. 9, 2007

(54) SYSTEMS AND METHODS FOR DRIVING LARGE CAPACITY AC MOTORS

(75) Inventor: Dick L. Knox, Claremore, OK (US)

(73) Assignee: Baker Hughes Incorporated, Houston, TX (US)

( * ) Notice: Subject to any disclaimer, the term of this patent is extended or adjusted under 35 U.S.C. 154(b) by 118 days.

(21) Appl. No.: 10/796,363

(22) Filed: Mar. 9, 2004

(65) Prior Publication Data

US 2004/0184292 A1    Sep. 23, 2004

Related U.S. Application Data

(60) Provisional application No. 60/436,593, filed on Mar. 17, 2003.

(51) Int. Cl.
*H01F 27/02* (2006.01)

(52) U.S. Cl. .................................................. 336/90

(58) Field of Classification Search ............... 336/65, 336/83, 90–92, 170, 180–185
See application file for complete search history.

(56) References Cited

U.S. PATENT DOCUMENTS

| | | | | |
|---|---|---|---|---|
| 3,235,823 | A | * | 2/1966 | Renberg, Jr. ................. 336/12 |
| 3,431,524 | A | * | 3/1969 | Broverman .................... 336/60 |
| 3,621,426 | A | * | 11/1971 | Bennon et al. ............... 336/58 |
| 3,986,080 | A | | 10/1976 | Sato |
| 4,000,482 | A | | 12/1976 | Staub et al. |
| 4,085,395 | A | | 4/1978 | Billerbeck et al. |
| 4,095,204 | A | | 6/1978 | Miyamoto et al. |
| 4,128,871 | A | * | 12/1978 | Murad ........................ 363/144 |
| 4,172,243 | A | | 10/1979 | Daugherty et al. |
| 4,236,134 | A | | 11/1980 | Alber et al. |
| 4,390,858 | A | | 6/1983 | Schulzer |
| 4,491,778 | A | | 1/1985 | Knox et al. |
| 4,513,243 | A | | 4/1985 | Novak et al. |
| 4,609,900 | A | | 9/1986 | Bachofer et al. |
| 4,739,296 | A | | 4/1988 | Fukatsu |
| 5,519,560 | A | | 5/1996 | Innes et al. |
| 5,905,367 | A | | 5/1999 | Hochgraf |
| 5,977,761 | A | | 11/1999 | Bilger et al. |
| 6,087,738 | A | | 7/2000 | Hammond |
| 6,144,276 | A | | 11/2000 | Booth |
| 6,169,674 | B1 | | 1/2001 | Owen |
| 6,278,354 | B1 | | 8/2001 | Booth |
| 2001/0032721 | A1 | | 10/2001 | Rider et al. |
| 2002/0024783 | A1 | | 2/2002 | Underwood et al. |

* cited by examiner

*Primary Examiner*—Tuyen T Nguyen
(74) *Attorney, Agent, or Firm*—Bracewell & Giuliani LLP (57) ABSTRACT

A drive system for driving large capacity motors includes a motor and a variable frequency drive which accepts input from a three-phase power source. The drive system includes a step-up transformer, preferably of a high-capacity three-phase type, positioned between and electrically connected to the motor and the variable frequency drive to thereby step-up voltage received from the variable frequency drive to be supplied to the motor. The transformer includes a transformer chamber formed in the transformer tank containing a cooling fluid for cooling transformer internal components. A plurality of inductors forming part of a harmonic filter are positioned within the transformer chamber such that they can be protected from the environment and simultaneously cooled with other transformer internal components by the dielectric fluid. The filter includes capacitors that are preferably mounted outside of the tank.

14 Claims, 7 Drawing Sheets

SYSTEMS AND METHODS FOR DRIVING LARGE CAPACITY AC MOTORS

RELATED APPLICATIONS

This application claims priority to provisional application Ser. No. 60/436,593 titled Systems and Methods for Driving Large Capacity AC Motors, filed on Mar. 17, 2003.

BACKGROUND OF THE INVENTION

1. Field of the Invention

This invention relates in general to systems and methods for driving large capacity AC motors and, in particular, to such systems and methods including a transformer.

2. Brief Description of Related Art

The oil drilling industry uses large volume submersible pumps typically located thousands of feet into a well. The pump assembly includes a centrifugal pump which is driven by an AC motor. The motors may range from 15 to 2000 horsepower, and thus, require a large supply of power. Normally, 60-cycle, three-phase power is supplied with voltage phase-to-phase being 480 volts or more. Common rotational speeds of the motor are about 3500 revolutions per minute (rpm). Most of these types of pumps are generally single speed pumps. Because of different viscosities, densities, well flowing characteristics, and the like, it is desirable to vary the speed of the motor. One way in which to vary the speed is to vary the frequency of the power being supplied. Normally, however, the line power comes from a utility company and cannot be changed from the standard 60-cycle per second. There are circuits that will convert the standard frequency to different frequencies. These circuits can also change the amplitude in proportion to the frequency change for efficient operation of the motor.

A technique for controlling the speed of a three-phase induction motor uses an electronic variable frequency drive (VFD). The electronic VFD has a rectifier circuit that requires multiple phases of alternating current. For example, a six-pulse rectifier needs three-phases of electric power to be input so that six pulses are provided by the full-wave rectification. One type of VFD uses pulse width modulation (PWM). Others use square waves, such as a six-step waveform.

Although multi-phase PWM inverters are useful, they can cause high order harmonic voltages resulting in detrimental high peak voltages at the motor, particularly with transformers and long lengths of cable between the VFD and the motor.

System filters consisting of an inductor and a shunt capacitor can be used to prevent or attenuate harmonic distortion. Applicant has recognized, however, that these filters have only been marginally successful due to problems related to environmental exposure. Applicant has also recognized that positioning the inductors in containers sufficient to prevent degradation due to the environment is problematic due to the excessive heat generated in the inductor coil of the filter arrangement.

SUMMARY OF THE INVENTION

With the foregoing in mind, embodiments of the present invention advantageously modify the traditional system for driving motors such as large capacity motors and advantageously eliminate or substantially reduce the harmful effect caused by PWM inverters. For example, in an embodiment of the present invention, a drive system for driving large capacity motors includes a motor and a variable speed drive which accepts input from a three-phase power source. The variable speed drive is electrically connected to the motor and positioned to vary speeds of the motor. The drive system further includes a transformer, preferably of a high-capacity three-phase type, positioned between and electrically connected to the motor and the variable speed drive to thereby step-up voltage received from the variable speed drive to be supplied to the motor.

In an embodiment of the present invention, the transformer includes a transformer housing defining a transformer tank and a transformer chamber formed in the transformer tank. A plurality of typically vertically oriented magnetic core elements and primary and secondary windings are positioned within the transformer chamber. The primary and secondary windings substantially surround at least portions of the core and provide the step-up voltage. A filter, generally configured as a low pass filter, includes a plurality of inductors and a plurality of capacitors and is provided to filter harmonics created by the variable speed drive. The plurality of inductors are uniquely also positioned within the transformer chamber. Each of the three-phases of the transformer includes at least one of the inductors preferably connected between a bushing connected to the transformer tank and the primary winding or windings associated with that individual phase of the three-phases.

The transformer chamber of the transformer tank further includes or contains a dielectric fluid, such as an insulating dielectric oil, for cooling the transformer internal components, i.e., the core, the primary and secondary windings, and advantageously also cools the plurality of inductors. Each of these transformer internal components including the plurality of inductors is at least partially immersed in the dielectric fluid. Convection currents in the dielectric fluid can help promote or cause cooling of the inductors along with the other transformer internal components.

The transformer can also include a recirculation line for cooling the dielectric fluid mounted exterior to the transformer tank. The recirculation line can be and preferably is connected between an outlet manifold adjacent the top of the transformer tank and an inlet manifold adjacent the bottom of the transformer tank. When so positioned, the heated dielectric fluid entering the recirculation line can be cooled by radiation cooling to the atmosphere, and can naturally, or with mechanical help, circulate downwardly to re-enter the tank adjacent the bottom.

Advantageously, according to an embodiment of the present invention, the transformer can function both as a conventional transformer and as the above described transformer capable of filtering harmonic frequencies created by a variable speed drive unit and capable of dissipating heat associated with such filtering. To utilize the above described transformer as a conventional transformer, the transformer also can include a plurality of inductor bypasses positioned to bypass the plurality of inductors. In a preferred configuration, each inductor bypass has a first end and second end, the first end connected to a bushing, the second end connected between an inductor and the primary winding to thereby bypass the inductor to allow the transformer to be used without the inductor.

The filter is generally configured in the form of a low pass filter comprising the plurality of inductors and a capacitor bank including a plurality of capacitors and positioned external to the transformer tank. Each capacitor within the capacitor bank is electrically connected to at least one of the inductors. In the preferred configuration, each capacitor is also connected preferably phase-to-phase at an input of the transformer. This configuration allows the capacitors to be easy disconnected in order to perfect bypassing the filter arrangement to allow the transformer to function as a conventional step-up transformer, or to electrically disconnect malfunctioning capacitors from the electrical circuit.

Advantageously, embodiments of the present invention also include a method for transforming electricity. For example, a method of transforming electricity can include a user providing a transformer including a transformer tank having a chamber at least partially filled with a dielectric cooling fluid, and containing a core, and a plurality of primary and secondary windings. The user positions a plurality of inductors in the chamber immersed either individually or in a separate container in the dielectric cooling fluid. This positioning allows the inductors to be cooled with the same dielectric fluid that cools other transformer internal components. By connecting each of the inductors in series with and between a primary bushing connected to the transformer tank and one of the plurality of primary windings, the user can form part of a low pass filter. The user also mounts preferably a capacitor bank to an external surface of the transformer tank and can electrically connect each capacitor in the capacitor bank to at least one of the inductors to further form the low pass filter. The user can supply AC power to the primary windings, filter the AC power with the inductor and capacitor, and deliver power from the second winding, while cooling the inductors and the windings with the dielectric fluid in the tank.

DETAILED DESCRIPTION

The present invention will now be described more fully hereinafter with reference to the accompanying drawings which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout, and the prime notation, if used, indicates similar elements in alternative embodiments.

Figure 1:
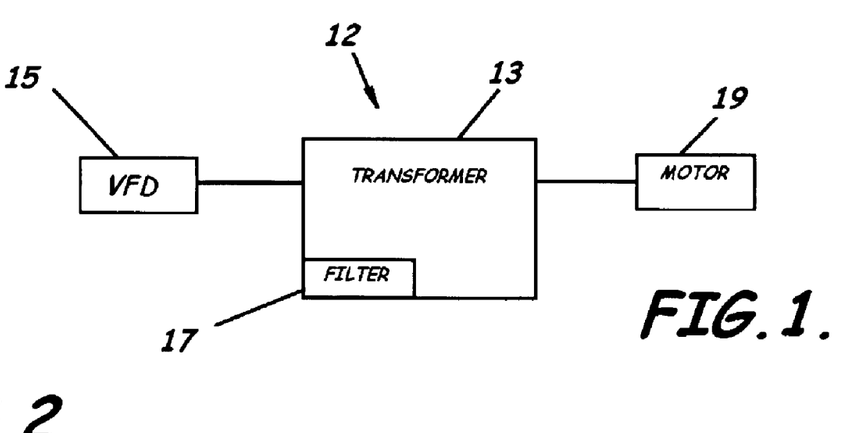
FIG. 1 is a block diagram illustrating a system for driving a motor, according to an embodiment of the present invention.
Figure 2:
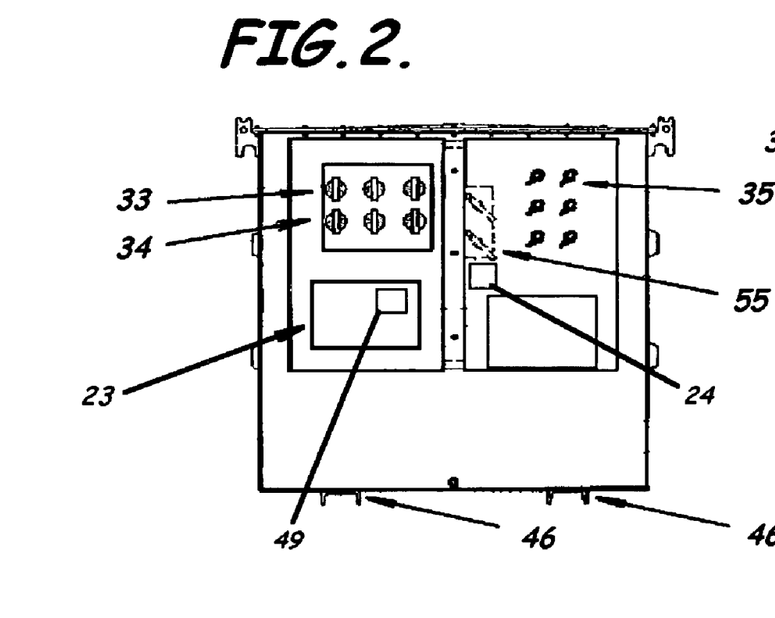
FIG. 2 is a front elevational view of a transformer of a system for driving a motor, according to an embodiment of the present invention.
Figure 3:
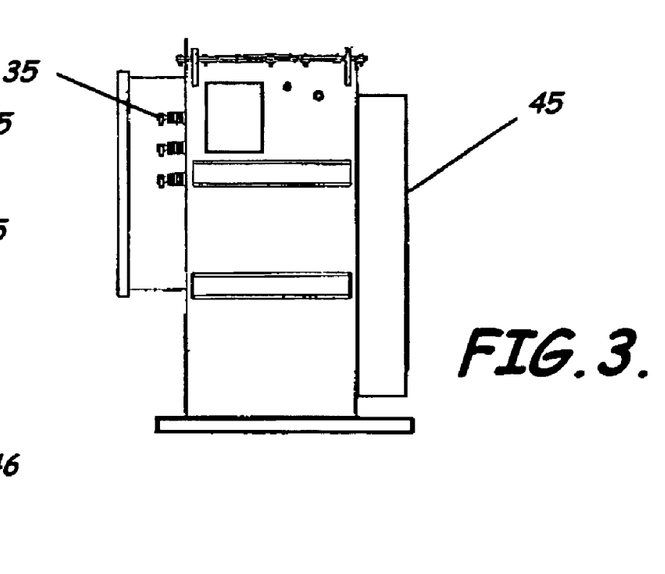
FIG. 3 is a side elevational view of a transformer of a system for driving a motor, according to an embodiment of the present invention.
Figure 4:
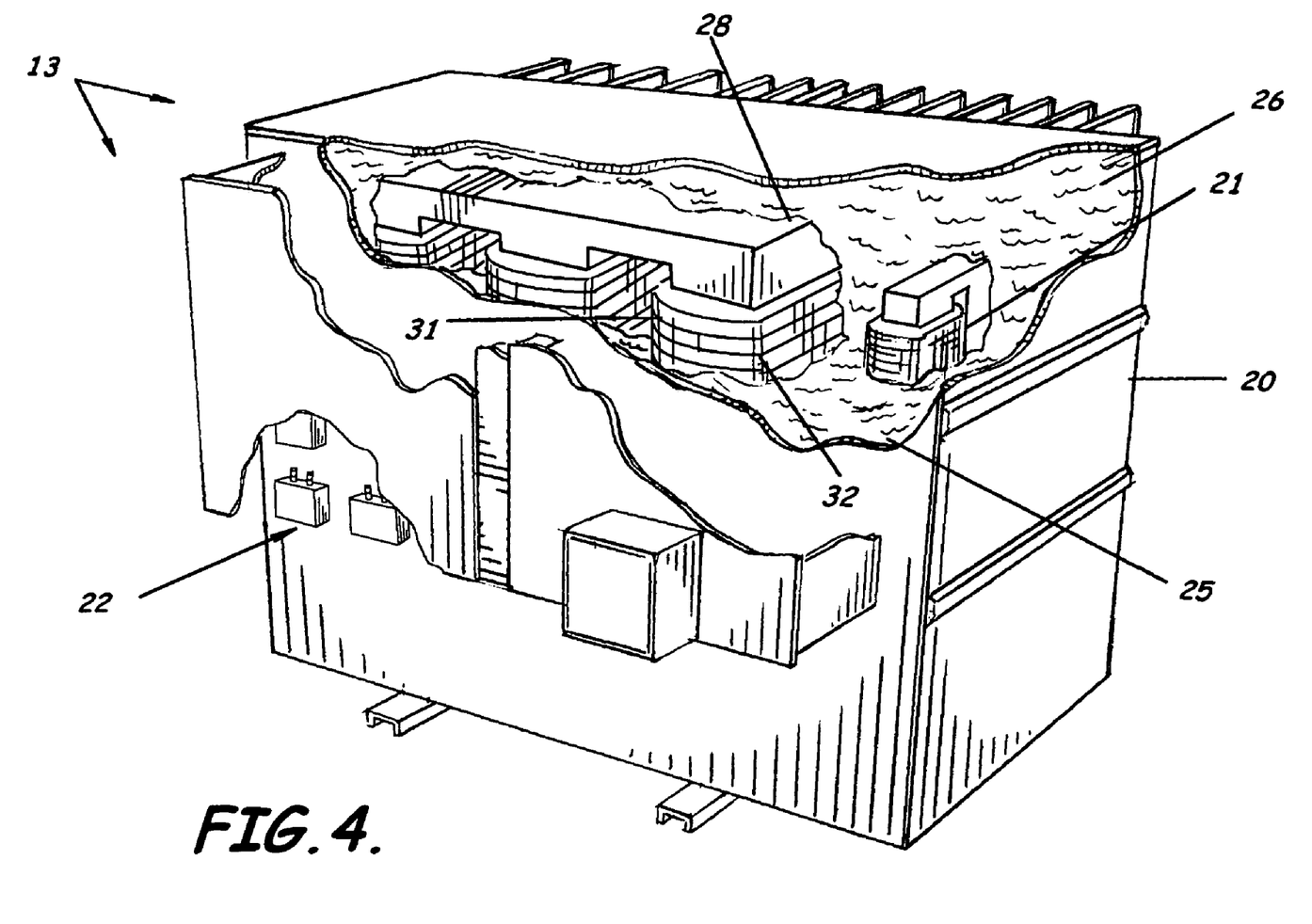
FIG. 4 is a fragmentary perspective view of a transformer of a system for driving a motor having portions thereof broken away for clarity, according to an embodiment of the present invention.

Referring to FIG. 1, illustrated is a drive system 12 capable of delivering a substantially sinusoidal waveform to a multi-phase alternating current (AC) motor such as three-phase high-power AC motor 19. The power normally available in a well site is a three-phase sinusoidal waveform (not shown), having Phase A, Phase B, and Phase C. Each phase alternates between positive and negative in a sine wave. The individual phases of this AC waveform or all three-phases can be used to drive a high-power motor, such as AC motor 19. In an embodiment of the present invention, the motor 19 typically operates between 15 to 2000 horsepower and is generally used in well-site operations. A variable speed drive unit, such as a variable frequency drive 15, of a pulse width modulated type and generally having a 480 volt output, is provided to vary the speed of the motor 19. Referring also to FIGS. 2–4, a high-capacity step-up transformer 13, having a typical output of 1000 to 5000 volts, is positioned between and electrically connected to the motor 19 and the variable frequency drive 15. The transformer 13 typically functions to step-up voltage received from the variable frequency drive 15, to be supplied to the motor 19. Note, the transformer 13 can also be implemented as a step-down transformer.

Figure 8:
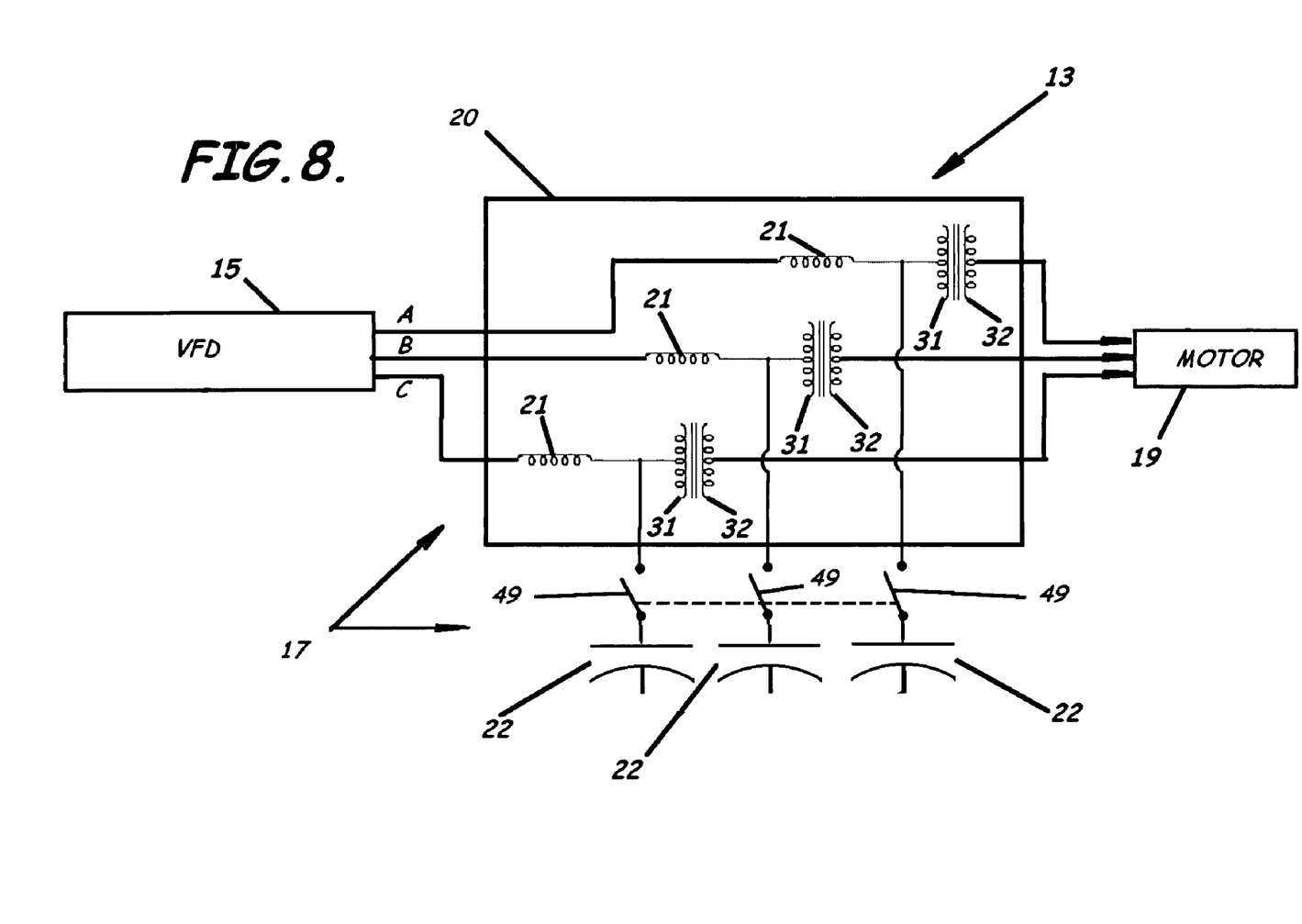
FIG. 8 is a schematic circuit diagram depicting a filter arrangement of a three-phase or three single-phase inductors within a transformer tank and capacitors mounted exterior of the transformer tank, according to an embodiment of the present invention.
Figure 9:
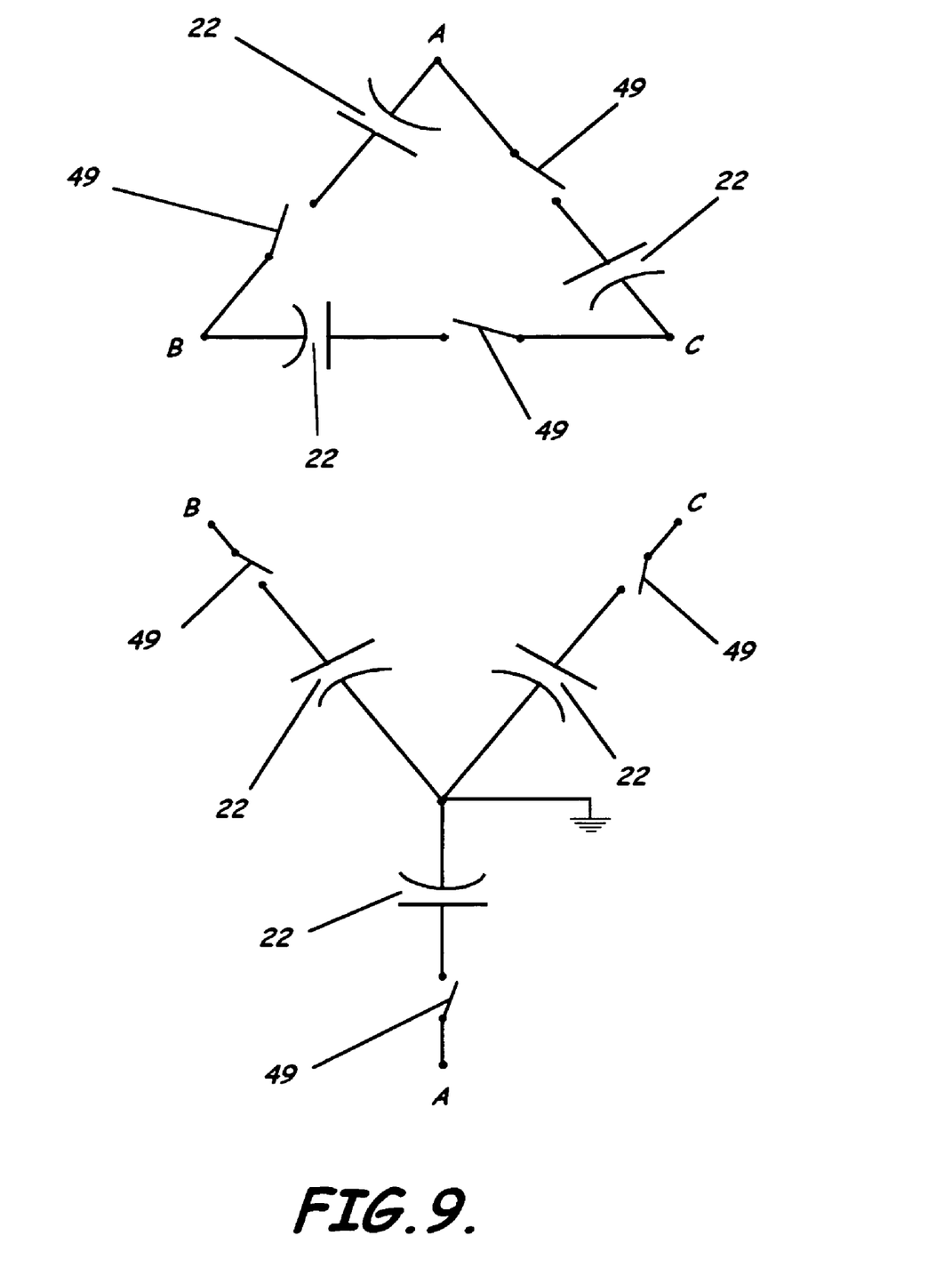
FIG. 9 is a schematic circuit diagram depicting capacitors and capacitor disconnect switches in a Delta and in a Wye configuration, according to an embodiment of the present invention.

Referring to FIG. 1 and 8, a filter arrangement such as low pass filters 17 can be employed to filter harmonics created or translated by the variable frequency drive 15 so that a more sinusoidal wave form is provided to the motor 19. Filter 17 preferably includes a set of inductors 21 and a set of capacitors 22. The inductors 21 are positioned within the transformer 13, and each are electrically connected in series between an output of variable frequency drive 15 and a corresponding input to transformer primary windings 31, respectively. The capacitors 22 are electrically connected to the transformer primary winding 31 in either a delta or wye configuration (FIG. 9). In the exemplary embodiment, the filter 17 includes three inductors 21, three single phases or one three-phase, each connected in series between the output of the variable frequency drive 15 and the primary windings 31 of one of the phases, and a three-phase capacitor bank 23 (FIG. 2) is preferably configured to connect phase-to-phase at the input of the transformer 13. Capacitor bank 23 comprises three capacitors 22 mounted as a unit. Note, the filter. 17 can be positioned on the secondary winding side of the transformer 13, but additional benefits are realized by positioning the filter 17 on the primary winding side of the transformer 13.

Figure 5:
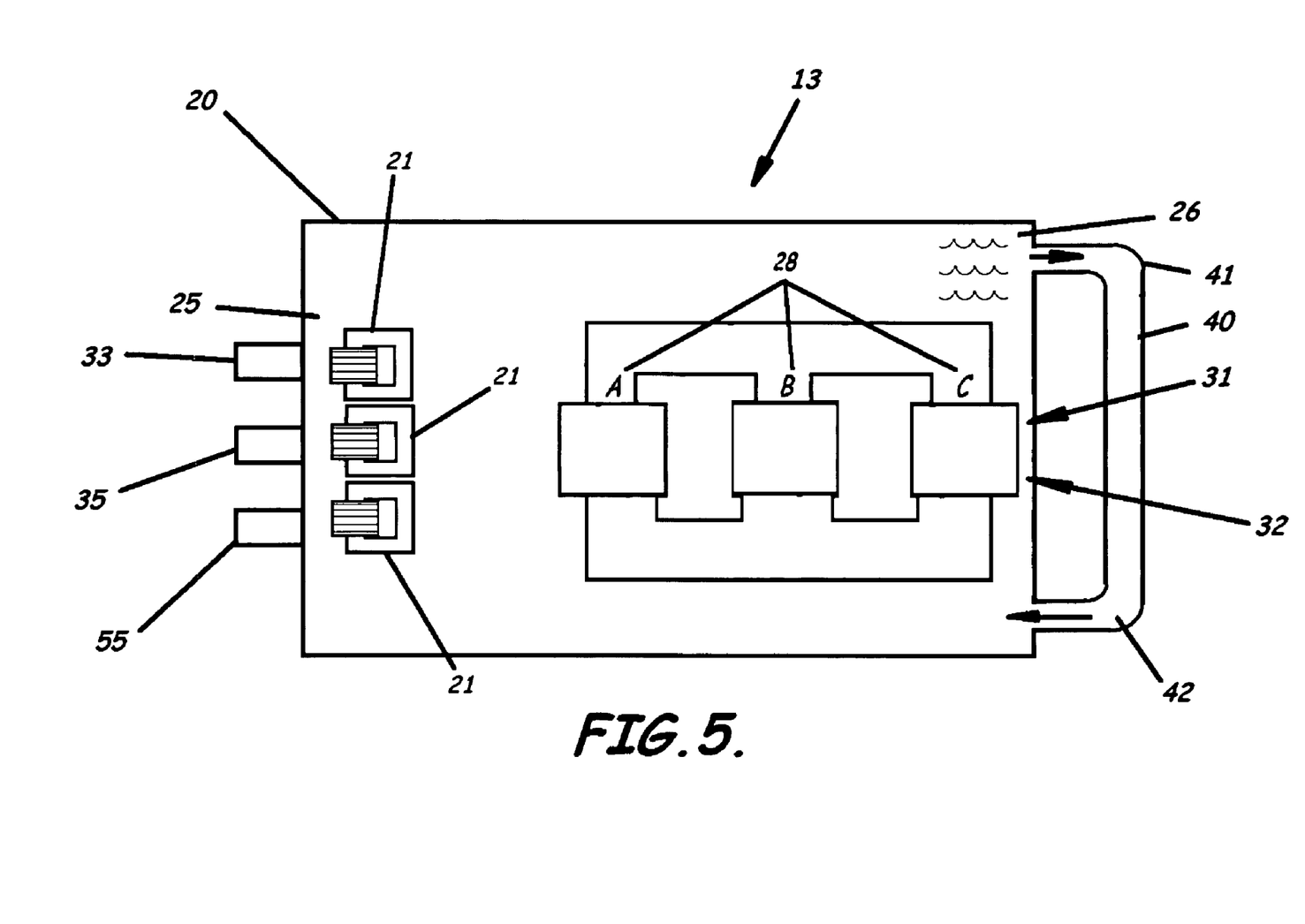
FIG. 5 is a schematic diagram of a transformer showing inductors and a magnetic core and windings immersed in a fluid coolant in a transformer tank with provisions for external cooling of the circulated coolant, according to an embodiment of the present invention.

Referring to FIG. 5, in an embodiment of the present invention, transformer 13 has a chamber 25 within a transformer housing or tank 20. A suitable liquid coolant, such as insulating dielectric fluid 26, typically having both insulating and cooling properties, can be positioned within chamber 25 of tank 20. The dielectric fluid 26 is preferably oil or an equivalent, as understood by those skilled in the art, which can be used for cooling the various transformer components. Transformer 13 has at least one magnetic core element per phase, 28A, 28B, 28C, located inside the transformer tank 20 to conduct magnetic flux.

Referring to FIGS. 5–8, transformer 13 has at least one primary winding 31 per phase. Each primary winding 31 has a first end and a second end, each electrically connected to a different primary bushing 33 in order to form a Delta configuration or Wye configuration (not shown). Each primary winding 31 is positioned to substantially surround at least portions of at least one of the vertically oriented magnetic core elements 28. The primary windings 31 are further at least partially immersed in dielectric solution 26 contained within the chamber 25 of the transformer tank 20.

Referring to FIGS. 2 and 3, the primary bushings 33 are mounted to the walls of the transformer tank 20. The primary bushings 33 send the transformer input current to the primary windings 31 located within the transformer tank 20, from external electric circuits, such as the variable frequency drive 15 (FIG. 1). The primary bushings 33 provide electrical insulation between the conductor (not shown) of each primary bushing 33 and the transformer tank 20.

Figure 6:
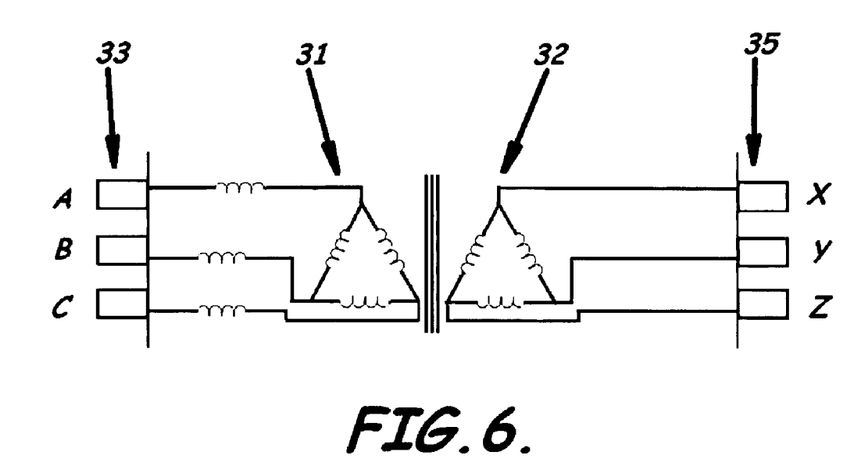
FIG. 6 is a schematic circuit diagram depicting three-phases of a three-phase transformer configured Delta-Delta, according to an embodiment of the present invention.
Figure 7:
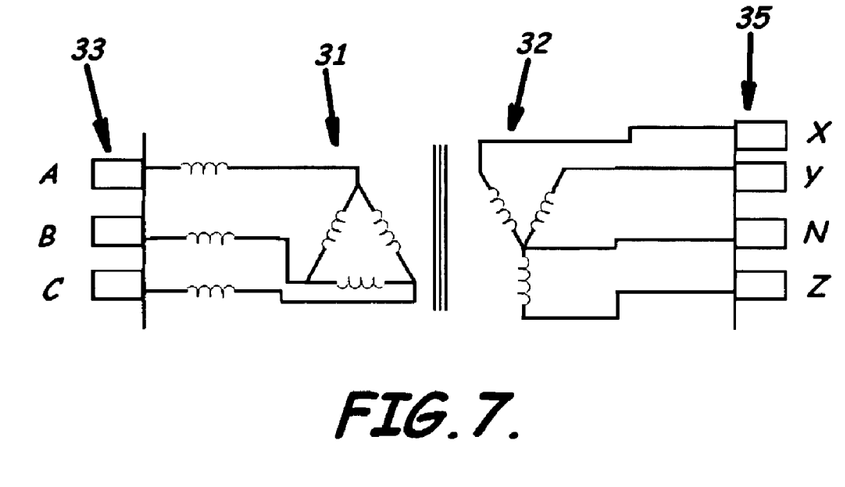
FIG. 7 is a schematic circuit diagram depicting three-phases of a three-phase transformer configured Delta-Wye, according to an embodiment of the present invention.

Referring to FIGS. 5–8, transformer 13 has at least one secondary winding 32 per phase. Each secondary winding 32 has a first end and a second end, each electrically connected to a different secondary bushing 35 in order to form a Delta configuration (FIG. 6) or Wye configuration (FIG. 7). Each secondary winding 32 is positioned to substantially surround at least portions of at least one of the magnetic core elements 28. The secondary windings 32 are further at least partially immersed in dielectric solution 26 contained within the chamber 25 of the transformer tank 20.

Referring to FIG. 4, although embodiments of the present invention have provisions for using a transformer tank 20 designed and equipped for forced cooling and have provisions for being either air-cooled or cooled by a non-fluid method, transformer 13 is preferably liquid-fluid cooled by natural circulation and convection. Where the cooling requirements are rather small, generally the surface area of the transformer tank 20 can provide for sufficient radiant cooling. Transformers requiring additional cooling can include fins which can increase the surface area available for cooling. Transformers requiring even more cooling can include cooling tubes or a radiator-type cooling system. For example, referring to FIG. 5, the transformer 13 can include at least one cooling and recirculation line 40 preferably mounted on an exterior portion of transformer tank 20 adjacent one side wall or completely around its periphery. Each cooling and recirculation line 40 is fluidly connected to the chamber 25 of transformer tank 20 via an outlet manifold 41 ideally located near the top of tank 20 and an inlet manifold 42 ideally located in the bottom of the tank. In a natural circulation and convection arrangement, heated dielectric fluid 26 rises to the top of the inner chamber 25 of tank 20. Heated fluid 26 entering the cooling and recirculation lines 40 is cooled by radiation cooling to the atmosphere or by forced air cooling typically using cooling panels 45 and fans (not shown). The fluid 26 naturally circulates downwardly to re-enter the inner chamber 25 of tank 20 at the bottom of the chamber 25. Channel members 46 (FIG. 2) fixed to the bottom surface of tank 20 also provide for additional cooling through air circulation, as can the general design of tank 20. Note, the use of pumps (not shown) in order to improve the recirculation is also within the scope of the present invention.

Referring to FIGS. 4, 8–11, in an embodiment of the present invention, the transformer electrical circuit includes filter 17 (FIG. 1) formed via one or more inductors 21 and one or more capacitors 22. The array of inductors 21 include at least one inductor 21 per electrical phase. Thus, in a three-phase arrangement, there are preferably three inductors 21 connected in series with the respective primary windings 31. The inductors 21 are housed within the inner chamber 25 of transformer tank 20 either individually, grouped together, or in their own protective container (not shown) immersed in a dielectric fluid. In the illustrated embodiment, the inductors 21 are immersed in the same dielectric solution 26 that is located in the inner chamber 25 of tank 20 for cooling windings 31, 32. Each inductor 21 is electrically connected between the respective primary bushings 33 and primary windings 31 associated with the individual phases, e.g., phase A, B, or C (FIG. 6).

Figure 10:
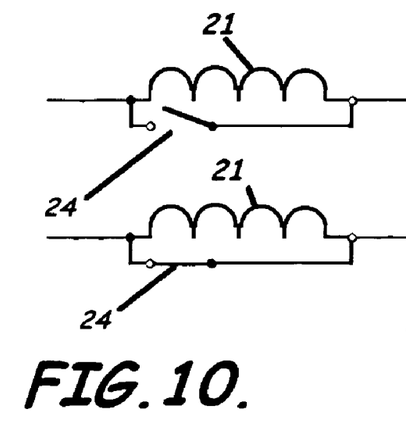
FIG. 10 is a schematic circuit diagram depicting a method of bypassing the inductors using a switch, according to an embodiment of the present invention.

Referring to FIG. 10, in an embodiment of the present invention, the inductors 21 could also include a bypass switch 24 for each inductor 21. At least one bypass switch 24 is probably electrically connected in parallel across inductors 21 for each phase A, B, C, forming means for bypassing inductors 21 to bypass the filter arrangement, and thus, a stage of the harmonic voltage filtering. The bypass switch 24 is typically a three-phase switch in the form of a rotary switch but can, however, be implemented using other various methods known and understood by those skilled in the art.

Figure 11:
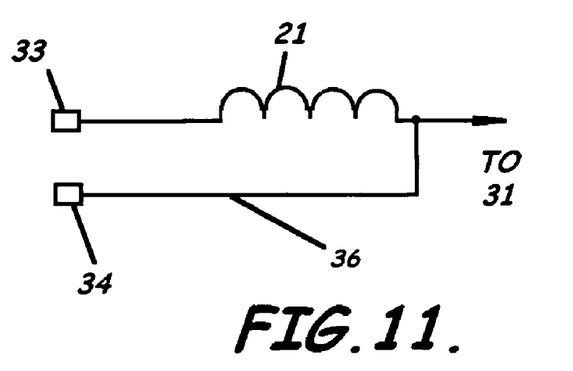
FIG. 11 is a schematic circuit diagram depicting a method of bypassing the inductors by using a separate set of primary bushings, according to an embodiment of the present invention.

Referring to FIG. 11, the inductor bypass can also be implemented without bypass switches 24. For example, an embodiment of the present invention can include a conductor 36 for each phase electrically connected between each auxiliary primary bushing 34 and each primary winding 31. By applying the transformer input power to the auxiliary primary bushings 34 rather than primary bushing 33, the inductors 21 are electrically bypassed with current flowing directly to the primary windings 31.

Referring to FIGS. 8 and 9, the capacitors 22 include at least one capacitor or capacitor group inter connected to act as a single capacitor, for each phase. Each of the terminals for the capacitors 22 is either electrically connected between a pair of the phases A, B, C, in the circuit as a delta connection, or one of the phases A, B, C, and neutral as a wye connection. The capacitors 22 are positioned at a location on or close to the transformer. More particularly, as illustrated, the capacitors 22 can be electrically connected between the connection of inductor 21 and primary windings 31. The capacitors 22 are preferably located exterior of tank 20 if the cooling fluid is a liquid. In a configuration, however, where the cooling fluid for the transformer internal components is not a liquid, capacitors 22 can instead be located inside transformer tank 20.

As shown in FIG. 2, the capacitors 22 can be in the form of a modular capacitor bank 23 mechanically attached to the exterior of tank 20. In this configuration, the capacitors 22 are electrically connected to the auxiliary primary bushings 34. Disconnecting capacitors 22 from electrical communication with the circuit is necessary for bypassing the filter arrangement. A switch 49 can perform such function. Switch 49 is preferably a three-phase switch that is electromechanically actuated, but can be implemented by other means known and understood by those skilled in the art.

Figure 12:
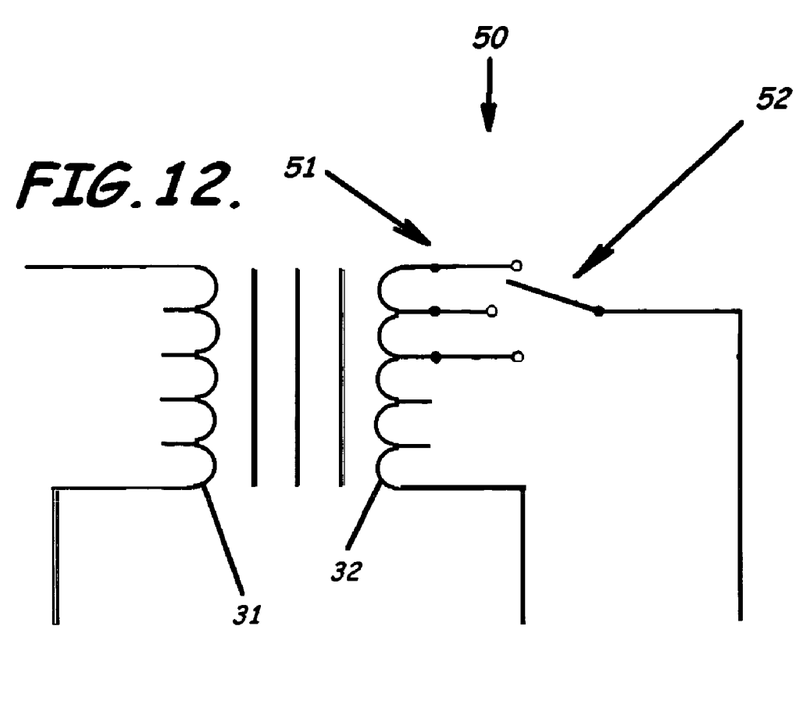
FIG. 12 is a schematic diagram of a transformer tap array utilized to select voltage showing tapped secondary winding and tap changer switches for a single output phase of a transformer, according to an embodiment of the present invention.

Referring to FIGS. 2 and 12, the transformer circuit can include a tap array 50 (FIG. 12) and tap changer 55 (FIG. 2) which provides for discrete voltage selection. For example, each of the secondary windings 32 (FIG. 12) can include a set of taps 51 and a tap switch 52. The tap switches 52 can be selectively electrically connected to taps 51 on the secondary winding 32. The tap switches 52 are each provided to allow corresponding secondary bushings 35 (FIG. 2) to be mechanically and electrically connected to the corresponding secondary winding's taps 51, which together comprise tap array 50. The tap switches 52 are typically located inside tank 20 and operated external to tank 20 via an actuator (not shown) connected to tap changer 55 and that extends through the wall of tank 20. In the preferred configuration, the voltage between taps is approximately a maximum of seven percent per tap 51.

In operation, a suitable source, such as a power utility, provides three-phase electric power to the pulse-width modulated variable frequency power drive 15 (FIG. 1). The variable frequency drive 15 converts fixed frequency power into variable frequency, variable voltage power that contains higher order harmonic voltages. Within the transformer 13, internal inductors 21 (FIG. 8) in electrical communication with the external or alternatively internal capacitors 22 filter the higher order harmonic voltages producing a substantially sinusoidal voltage waveform. The voltage is stepped up via the primary and secondary windings 31, 32. The heat generated from the inductors 21 and windings 31, 32, is dissipated from within the tank 20 through convection or other techniques. The substantially sinusoidal waveform with increased voltage is then available to the motor 19.

The invention has significant advantages. Application of a filter arrangement having inductors within the transformer tank not only can serve to eliminate the harmful effect caused by a non-sinusoidal voltage waveform but provide a methodology for cooling those inductors through use of the cooling system already associated with a transformer. Advantageously, when necessary, either the inductors or capacitors comprising a filter can be bypassed.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification. For example, the drive system may be in a form other than pulse width modulation.

That claimed is:

1. A transformer assembly comprising:
   a transformer tank having a chamber containing a cooling fluid;
   a plurality of bushings mechanically interfaced with the transformer tank;
   a primary winding having first and second ends, each of the ends electrically connected to a bushing to form a delta or wye connection; and
   an inductor electrically connected to the primary winding for filtering, the inductor positioned in the chamber.

2. The transformer assembly as defined in claim 1, wherein the inductor is electrically connected between one of the bushings and the primary winding for filtering harmonics created by a variable speed drive.

3. The transformer assembly as defined in claim 1, further comprising a capacitor electrically connected to the inductor and positioned so that the combination of the inductor and the capacitor form a low pass filter.

4. The transformer assembly as defined in claim 1, wherein the cooling fluid is a liquid and wherein the primary winding and the inductor are at least partially immersed in the liquid.

5. The transformer assembly as defined in claim 1, further comprising an inductor bypass having a first end and second end, the first end of the bypass connected to one of the plurality of bushings, the second end of the bypass connected between the inductor and the primary winding to thereby selectively bypass the inductor to allow the transformer assembly to be used without the inductor.

6. The transformer assembly as defined in claim 1, further comprising a secondary winding including a set of taps and a corresponding set of tap switches, each selectively electrically connected to one of the taps to provide for a discrete voltage selection.

7. A three-phase transformer assembly comprising:
   a housing defining a tank, a chamber formed in the tank, and an insulating dielectric cooling liquid positioned in the chamber to cool transformer components within the chamber;
   a plurality of primary bushings mechanically interfaced with the transformer tank;
   three primary windings, each of the primary windings having a first and second end electrically connected to a primary bushing, each of the primary windings positioned around a magnetic core element and at least partially immersed in the dielectric cooling liquid;
   a plurality of secondary bushings mechanically interfaced with the transformer tank;
   three secondary windings, each of the secondary windings each having a first and second end electrically connected to a secondary bushing, each of the secondary windings positioned around the magnetic core element and at least partially immersed in the dielectric cooling liquid;
   a plurality of inductors positioned in the chamber of the tank and at least partially immersed in the dielectric cooling liquid, each of the inductors electrically connected between one of the primary bushings and corresponding primary windings; and
   a capacitor bank including a plurality of capacitors positioned external to the transformer tank, each of the capacitors within the capacitor bank electrically connected to a respective at least one of the plurality of inductors.

8. The transformer assembly as defined in claim 7, further comprising a plurality of inductor bypasses having a first end and second end, the first end of each bypass connected to one of the plurality of primary bushings, the second end of each bypass connected between one of the inductors and the primary windings to thereby selectively bypass the respective inductor to allow the transformer assembly to be used without the inductors.

9. The transformer assembly as defined in claim 7, wherein at least one of the secondary windings includes a set of taps and a corresponding set of tap switches, each selectively electrically connected to one of the taps to provide for a discrete voltage selection.

10. The transformer assembly defined in claim 7, wherein each capacitor and inductor is positioned to form a low pass filter.

11. The transformer assembly as defined in claim 1,
wherein the transformer assembly is a three-phase transformer assembly;
wherein the cooling fluid is insulating dielectric cooling liquid positioned in the chamber to cool transformer components within the chamber;
wherein the primary winding is a first primary winding;
wherein the transformer assembly includes a second and a third primary winding each having a first and second end electrically connected to a primary bushings;
wherein each of the primary windings is positioned around a magnetic core element and at least partially immersed in the dielectric cooling liquid;
wherein the inductor is a first inductor;
wherein the transformer assembly further includes a second and a third inductor each positioned in the chamber of the tank and at least partially immersed in the dielectric cooling liquid, each of the inductors electrically connected between one of the primary bushings and corresponding primary windings; and
wherein the transformer assembly further includes a of capacitors positioned external to the transformer tank, each of the capacitors electrically connected to a respective at least one of the inductors for filtering.

12. The transformer assembly as defined in claim 11, further comprising a plurality of inductor bypasses having a first end and second end, the first end of each bypass connected to one of the plurality of primary bushings, the second end of each bypass connected between one of the inductors and the primary windings to thereby selectively bypass the respective inductor to allow the transformer assembly to be used without the inductors.

13. The transformer assembly as defined in claim 11, further comprising:
a plurality of secondary bushings mechanically interfaced with the transformer tank;
three secondary windings, each of the secondary windings each having a first and second end electrically connected to the secondary bushings, each of the secondary windings positioned around the magnetic core element and at least partially immersed in the dielectric cooling liquid; and wherein
at least one of the secondary windings includes a set of taps and a corresponding set of tap switches, each selectively electrically connected to one of the taps to provide for a discrete voltage selection.

14. The transformer assembly defined in claim 11, wherein the plurality of capacitors form a capacitor bank, wherein the capacitor bank is mounted to the transformer tank, and wherein a combination of the inductors and the capacitors form a three-phase low pass filter arrangement.

* * * * *

UNITED STATES PATENT AND TRADEMARK OFFICE
CERTIFICATE OF CORRECTION

| | | |
|---|---|---|
| PATENT NO. | : 7,161,456 B2 | Page 1 of 1 |
| APPLICATION NO. | : 10/796363 | |
| DATED | : January 9, 2007 | |
| INVENTOR(S) | : Dick L. Knox | |

It is certified that error appears in the above-identified patent and that said Letters Patent is hereby corrected as shown below:

Column 4, line 54, delete "are" and insert --is--

In the Claims:

Column 9, line 7, insert --an-- before "insulating"
Column 9, line 24, insert --plurality-- before "of"

Signed and Sealed this

Twenty-second Day of May, 2007

JON W. DUDAS
*Director of the United States Patent and Trademark Office*